(12) United States Patent
Granger

(10) Patent No.: US 8,773,099 B2
(45) Date of Patent: Jul. 8, 2014

(54) METHODS TO REDUCE OUTPUT VOLTAGE RIPPLE IN CONSTANT ON-TIME DC-DC CONVERTERS

(75) Inventor: Steven M. Granger, Apex, NC (US)

(73) Assignee: Semtech Corporation, Morrisville, NC (US)

( * ) Notice: Subject to any disclaimer, the term of this patent is extended or adjusted under 35 U.S.C. 154(b) by 344 days.

(21) Appl. No.: 13/197,326

(22) Filed: Aug. 3, 2011

(65) Prior Publication Data

US 2013/0033248 A1 Feb. 7, 2013

(51) Int. Cl.
*H02M 3/156* (2006.01)

(52) U.S. Cl.
USPC ........................................................ 323/284

(58) Field of Classification Search
USPC ........................................ 323/283–284, 288
See application file for complete search history.

(56) References Cited

U.S. PATENT DOCUMENTS

| | | | |
|---|---|---|---|
| 6,495,995 B2 | 12/2002 | Groom et al. | |
| 7,279,869 B2 * | 10/2007 | Tzeng et al. | 323/222 |
| 7,436,158 B2 | 10/2008 | Huang et al. | |
| 7,615,973 B2 | 11/2009 | Uehara | |
| 7,714,547 B2 | 5/2010 | Fogg et al. | |
| 7,876,081 B2 * | 1/2011 | Hachiya et al. | 323/284 |
| 8,253,507 B2 * | 8/2012 | Tang et al. | 332/109 |
| 8,427,128 B2 * | 4/2013 | Tsai | 323/284 |
| 2010/0033215 A1 * | 2/2010 | Fogg et al. | 327/137 |

OTHER PUBLICATIONS

Author Unknown. "3A, Constant on Time Buck Converter." National Semiconductor, LM2696, May 18, 2009, pp. 1-20.

Author Unknown. "DC-DC Converter Tutorial." Maxim, Application Note 2031, Nov. 29, 2001, pp. 1-10.

Author Unknown. "Synchronous Current-Mode with Constant On-Time, PWM Buck Controller." Analog Devices, ADP1872/ADP1873, copyright 2009-2010, pp. 1-40.

Davis, S. "Adaptive On-Time DC-DC Converters Combine Speed and Efficiency." PETinnovations, Power Electronics Technology for Designers and System Engineers, A Penton Media Publication, copyright 2010, pp. 41-44.

Author Unknown. "High-Efficiency, Quad-Output, Main Power Supply Controllers for Notebook Computers." ISL6237, intersil, Data Sheet, FN6418.4, Mar. 18, 2008, pp. 1-35.

Author Unknown. "Quick-PWM Step-Down Controllers with Inductor Saturation Protection and Dynamic Output Voltages." Max1992/MAX1993, Maxim Integrated Products, Rev. 1, Sep. 2005, pp. 1-36.

Author Unknown. "EcoSpeed DC-DC Buck Controller with Programmable LDO." SC418, Semtech Corporation, Jul. 27, 2010, pp. 1-30.

Author Unknown. "Single Phase, D-CAP+ Synchronous Buck Controller with Integrated Drivers for General IC VCore Applications." TPS51513, Texas Instruments, Jun. 2009—Revised Feb. 2010, pp. 1-38.

* cited by examiner

*Primary Examiner* — Harry Behm

(74) *Attorney, Agent, or Firm* — Coats and Bennett, P.L.L.C.

(57) ABSTRACT

According to one aspect of the teachings herein, a DC-to-DC converter operates according to an advantageous constant on-time topology that reduces output voltage ripple during light load conditions. The converter produces an output voltage by driving high-side and low-side switches in an inductor-based switching circuit, and regulates the output voltage by varying the on-time of a low-side switch, while holding the on-time of the high-side switch constant. Advantageously, the converter shortens the on-time of the high-side switch during light load conditions, which reduces the output voltage ripple. Thus, the converter may be understood as using a first, constant on-time for the high-side switch during "normal" operations and a second, shorter on-time for the high-side switch during light load conditions.

14 Claims, 11 Drawing Sheets

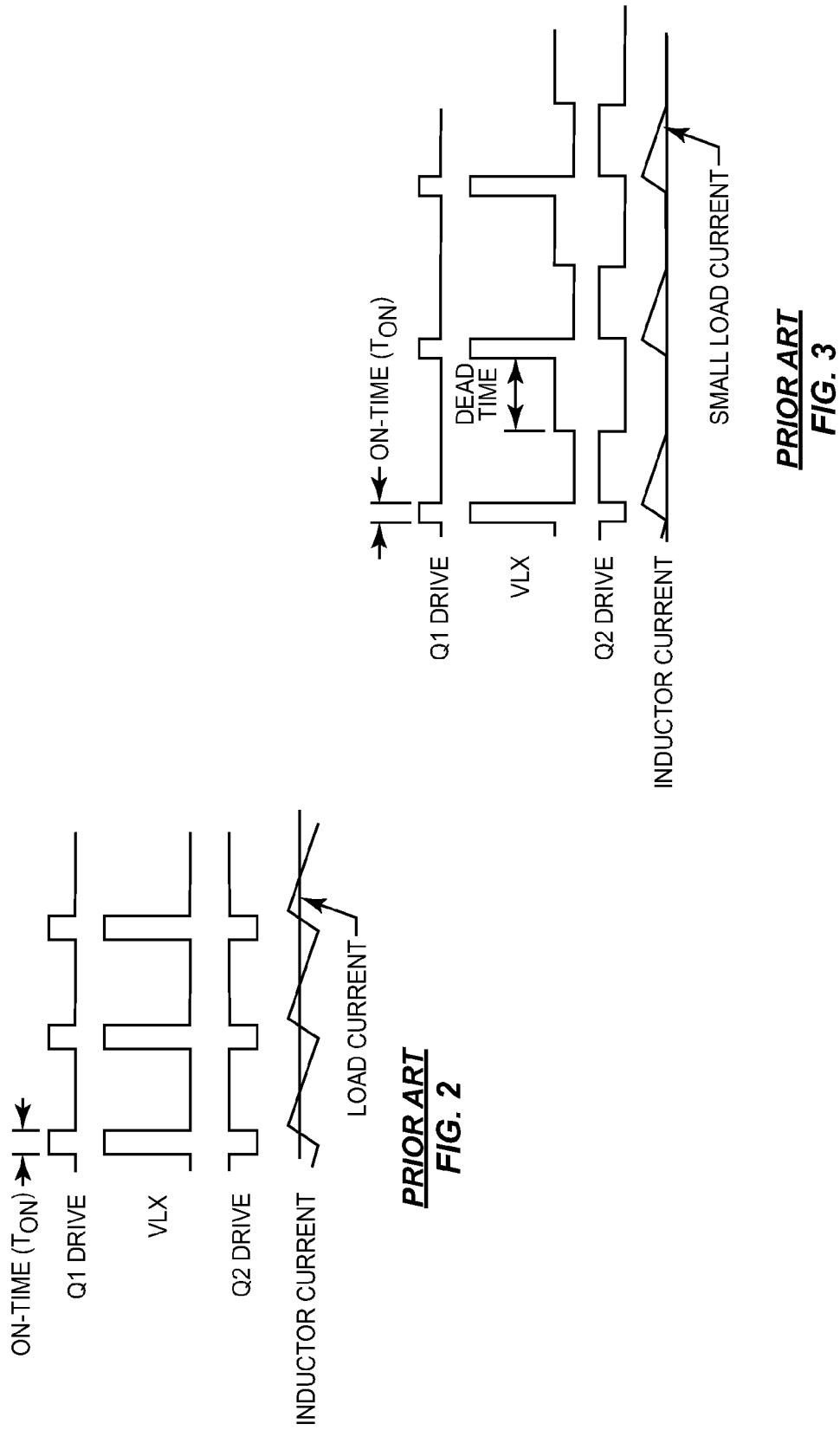

METHODS TO REDUCE OUTPUT VOLTAGE RIPPLE IN CONSTANT ON-TIME DC-DC CONVERTERS

FIELD OF THE INVENTION

The present invention generally relates to voltage regulation and DC-to-DC converters, and particularly relates to improving the performance of constant on-time DC-to-DC converters.

BACKGROUND

DC-to-DC converters function as "power converters" by changing a source of direct current from an input voltage level to a desired output voltage level. Certain types of DC-to-DC converters also find use in synchronous rectification and other applications. While the term "DC-to-DC converter" broadly encompasses both linear-mode converters and switched-mode converters, the term is used herein to particularly connote switched-mode converters.

One type of switched-mode converter accomplishes the desired voltage conversion by temporarily storing energy taken from the input voltage source in the magnetic field of an inductor or transformer and then releasing the stored energy at the output of a switching circuit that includes the inductor or transformer. The switching circuit generally includes high-side and low-side switching elements (e.g., power MOSFETs) used for accomplishing the timed energy storage and release cycles. The switching element may be integrated into the DC-to-DC converter, or it may have an output drive stage, for driving external switching elements.

DC-to-DC converters generally can be configured as step-down converters ("buck") that provide an output voltage lower than the input supply voltage, or they may be configured as step-up ("boost") converters that boost input voltage. Moreover, DC-to-DC converters come in a wide variety of control topologies. Here, the term "control topology" denotes the particular control scheme adopted by the DC-to-DC converter for controlling its output voltage generation. The term therefore connotes the control logic and/or may connote the particular feedback circuitry used by the DC-to-DC converter for monitoring output voltage and/or output load conditions.

In some respects, the particular control topology used in a given application may be dictated by design constraints or specified performance requirements. However, in a broad sense many DC-to-DC converter applications require high efficiency while operating over a wide load range. Consider, for example, the capacity-limited batteries used in cellular telephones and other small consumer electronic devices. In those contexts, efficiency may not be the paramount design consideration but it is almost always key to obtaining the longest possible operating time from a given level of battery charge.

One widely used method of achieving such efficiency involves the use of a DC-to-DC converter control topology termed "constant on-time" or "COT." In an example COT topology, illustrated by known COT DC-to-DC converter 10 in FIG. 1. The illustrated converter 10 provides load current to a load 12 (e.g., a DC-powered circuit or device) at a desired voltage $V_{OUT}$, based on a COT controller 14 driving an H-bridge switching circuit that includes two MOSFETs, Q1 and Q2, and an output inductor L.

The controller 14 includes Q1 and Q2 drivers 16 and 18 for switching the MOSFETs Q1 and Q2, respectively, and further includes an on-time pulse generator 20 for generating high-side and low-side pulses to control the on-off switching of Q1 and Q2 via the drivers 16 and 18. The controller 14 further includes an on-time comparator 22 that triggers the on-time pulse generator 20 responsive to a feedback signal generated by a feedback circuit 24 used for monitoring the output voltage $V_{OUT}$.

One also sees a program resistor 26 that is used to set the constant on-time of the high-side pulses generated by the on-time pulse generator 20 for the Q1 driver 16, which will be understood to be the "high-side" switch driver. This designation arises because the Q1 MOSFET connects the switched inductor L1 to the input supply voltage V. Conversely, the Q2 driver 18 is referred to as the "low-side" switch driver because it controls switching of the Q2 MOSFET, which connects the switched inductor L1 to signal ground.

A "switching cycle" in this regard includes a time during which Q1 is switched on ("conducting"), while Q2 is off (not conducting), followed by a time during which Q2 is switched on and Q1 is off. The time that Q1 conducts during each cycle is termed the "on-time" ($T_{ON}$) and the COT topology holds that on-time substantially constant, at least for a given input-output voltage relationship. Indeed, the hallmark of the COT converter topology is that the width of each on-time pulse does not vary for a given set of $V_{IN}/V_{OUT}$ conditions. (Here, the term "does not vary" must be understood in a common sense fashion, meaning that small, unintended variations in on-time may occur, but the operating aim of the COT topology is to hold $T_{ON}$ constant from switching cycle to switching cycle.) With this approach, the COT-based converter accomplishes regulation of $V_{OUT}$ by varying the conduction time of the low-side switch Q2.

See FIG. 2 for known control and operation signals for the converter 10 of FIG. 1. In the diagram, a high state for the Q1 and Q2 drive signals equals "ON," while a low state equals "OFF." One therefore sees that Q2 is driven OFF when Q1 is driven ON, and vice versa. Moreover, one sees that the high-side pulse width on time ($T_{ON}$) is held constant. FIG. 2 also shows the inductor current waveform corresponding to the Q1/Q2 switching control. (Note that FIG. 2 assumes steady-state load conditions and one therefore does not see any variation in the on-time of the low-side pulses driving Q2, but it will be understood that regulation control of $V_{OUT}$ is effected by varying the low-side pulse on-time.)

In a known approach to COT-based control, the constant on-time $T_{ON}$ of the high-side pulses used to drive the Q1 transistor is set according to the following equation:

$$T_{ON} = \frac{V_{OUT}}{V_{IN}} \cdot K,$$

where $V_{OUT}$ is the target output voltage—i.e., the regulated voltage to be maintained at the output of the switching circuit—and where $V_{IN}$ is the input supply voltage and K typically is a value that can be set by the circuit designer (perhaps within a defined range). See, for example, the program resistor 26 of FIG. 1, where the resistance value chosen determines the value of K.

The COT control method makes it relatively easy to operate in a power saving mode at light loads. To implement power saving mode, a COT-based controller inserts additional "dead time" into the switching cycle, during which neither the high-side switch Q1 nor the low-side switch Q2 is conducting—i.e., both switches are "OFF" during the dead time. See the example diagram of FIG. 3, which illustrates dead time insertion. The dead time insertion technique extends the overall switching cycle and therefore reduces the switching frequency, which reduces the switching losses associated with the high-side and low-side switches Q1 and Q2. The power saving mode thus yields higher efficiency at light loads.

The SEMTECH CORPORATION sells an exemplary COT-based converter, identified as the "SC418ULTRT." A detailed data sheet is available for this part and it explains general aspects of COT-based control, along with providing specific design and performance information for the SC418ULTRT.

One characteristic of heretofore known approaches to COT-based control is that the constant on-time $T_{ON}$ generally is programmed or otherwise set at design time and is fixed during converter operation (for fixed input/output voltage conditions). This approach causes significantly increased output voltage ripple during light load conditions. Consider that during any switching cycle, the inductor current exceeds the load current for part of the cycle. The output capacitor $C_{OUT}$ (see FIG. 1) absorbs the excess current flowing from the inductor, creating a voltage ripple at the capacitor. At high load currents when the converter operates in "continuous conduction mode" (CCM), the inductor current ripple is centered on the load current.

The diagram of FIG. 4 illustrates this condition. As shown in the diagram, such operation results in a net charge flowing into and out of the capacitor during the switching cycle. For the CCM case, where at all times one of the two transistors Q1 and Q2 is on except for inherent dead-time delays at on/off transitions edges, the net charge, $\Delta Q_{CCM}$, absorbed by the output capacitor can be expressed as:

$$\Delta Q_{CCM} = (T_{ON})^2 \cdot (V_{IN}/V_{OUT}) \cdot (V_{IN} - V_{OUT})/(8 \cdot L).$$

where L is the inductance of the switched inductor in Henrys.

At light load currents, the inductor current is not centered on the load current. If the load current is near zero, the net charge absorbed by the output capacitor is much higher. Refer to the example diagram in FIG. 5. The higher net charge results in higher output ripple voltage. For this no-load case (or for near-zero loads) the net charge, $\Delta Q_{NL}$, absorbed by the output capacitor can be expressed as:

$$\Delta Q_{NL} = (T_{ON})^2 \cdot (V_{IN}/V_{OUT}) \cdot (V_{IN} - V_{OUT})/(2 \cdot L).$$

Comparing these equations, one sees that $\Delta Q_{NL}$ is four times the value of $\Delta Q_{CCM}$. This increase nominally results in a corresponding fourfold increase in output voltage ripple at light loads, although the actual increase depends on several issues, such as the characteristics of output capacitor used.

SUMMARY

According to one aspect of the teachings herein, a DC-to-DC converter operates according to an advantageous constant on-time topology that reduces output voltage ripple during light load conditions. The converter produces an output voltage by driving high-side and low-side switches in an inductor-based switching circuit, and regulates the output voltage by varying the on-time of a low-side switch, while holding the on-time of the high-side switch constant. Advantageously, the converter shortens the on-time of the high-side switch during light load conditions, which reduces the output voltage ripple. Thus, the converter may be regarded as using a first on-time for the high-side switch during "normal" operations and a second, shorter on-time for the high-side switch during light load conditions.

Thus, in one aspect of the present invention, a DC-to-DC converter operates as a constant on-time converter during normal load conditions. During these normal load conditions, the DC-to-DC converter regulates its output voltage by varying the on-time of its low-side switch, while keeping the on-time of its high-side switch set to some constant value. However, the DC-to-DC converter shortens the on-time of its high-side switch during light load conditions, as compared to the constant on-time used during normal load conditions, to reduce output voltage ripple. In general, the high-side switch has an on-time, whether operating in a normal mode, or a power saving mode because of light load conditions. In the normal mode, the DC-to-DC converter uses a constant on-time for the high-side switch and in the power saving mode uses a comparatively shorter on-time for the high-side switch.

In an example embodiment, a constant on-time DC-to-DC converter comprises a regulation control circuit, a feedback circuit, and an on-time control circuit, which may be included in the regulation control circuit. The regulation control circuit is configured to an output voltage generated at an output of a switching circuit where the switching circuit is supplied by an input voltage. The regulation control circuit regulates the output voltage based on generating high-side and low-side pulses for driving high-side and low-side switches, respectively, in the switching circuit according to a switching cycle. The switching cycle has a variable on-time for the low-side switch and, at least for normal mode operation, it has a constant on-time for the high-side switch.

Here, the term "constant on-time" does not imply the absence of minor deviations such as "jitter" that inevitably arise in electronic circuits, but rather indicates that regulation of the output voltage is based on varying the on-time of the low-side switch while nominally holding the on-time of the high-side switch to some fixed value. Moreover, it will be understood that even in the described constant on-time control topology, the absolute value of the constant-on time may be functionally dependent on the relationship between the input (supply) voltage and the targeted output voltage. Additionally, or alternatively, the constant on-time may be dependent on user "programming" in embodiments where the converter is configured to receive or monitor one or more control values that allow the circuit designer to establish the nominal value of the constant on-time.

With these points in mind, the feedback circuit is configured to provide a regulation feedback signal to the regulation control circuit, for controlling the variable on-time of the low-side switch as needed to maintain regulation of the output voltage. That is, the regulation control circuit maintains the targeted output voltage by controlling the variable on-time of the low-side switch in dependence on the value of the feedback regulation signal, which may be a voltage-mode or current-mode signal for example.

The on-time control circuit included in the regulation control circuit is configured to decrease output voltage ripple in the output voltage during a power saving mode of operation of the regulation control circuit. The on-time control circuit does so by shortening the on-time of the high-side switch during the power saving mode, as compared to the constant on-time used during a normal mode of operation of the regulation control circuit. In this regard, it will be appreciated that the regulation control circuit is configured to enter the power saving mode of operation responsive to detecting light load conditions and to reduce switching losses in said switching circuit while operating in the power saving mode by inserting a variable "dead time" into the switching cycle. Here, "dead time" connotes the case where the control circuit holds both the high-side and low-side switches in the off state, so that neither one is conducting.

In another embodiment, a method of constant on-time control in a DC-to-DC converter includes generating an output voltage at an output of a switching circuit supplied by an input voltage. Such operation is based on generating high-side and low-side pulses for driving high-side and low-side switches, respectively, in the switching circuit according to a switching cycle having a constant on-time for the high-side switch, at least during normal mode operation, and a variable on-time for the low-side switch. In this regard, the method includes dynamically varying the on-time of the low-side switch responsive to a feedback regulation signal indicative of the output voltage, to regulate the output voltage.

More notably, the method includes decreasing output voltage ripple in the output voltage during a power saving mode of operation of the regulation control circuit, by shortening the on-time of the high-side switch during the power saving mode, as compared to the constant on-time used during a normal mode of operation of the regulation control circuit. Thus, as noted, the regulation control circuit may be regarded as using a first, constant on-time during its normal mode of operation, and as using a second, shorter on-time during its power saving mode of operation. The second, shorter on-time is constant, as well, in at least one embodiment. In another embodiment, it varies as a function of the extended switching cycle time or extended dead time, which in turn is a function of the load current.

According to one or more embodiments of the method, the converter enters the power saving mode of operation from the normal mode of operation and does so in response to detecting light load conditions. The converter may monitor output voltage, inductor current, or load current, or essentially any signals related thereto, to detect light load conditions. In any case, in its power saving mode of operation, the converter reduces switching losses in the switching circuit by inserting a variable dead time into the switching cycle. Doing so extends the switching cycle, which lowers switching frequency and hence reduces switching losses. Note that the converter may be configured to return to normal mode in response to any of the signals or operating states that could be used to detect light load conditions.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a diagram of certain waveforms corresponding to "normal" operation of the converter of FIG. 1.

FIG. 3 is a diagram of the same waveforms, for "light load" operation of the converter of FIG. 1.

DETAILED DESCRIPTION

Figure 1:
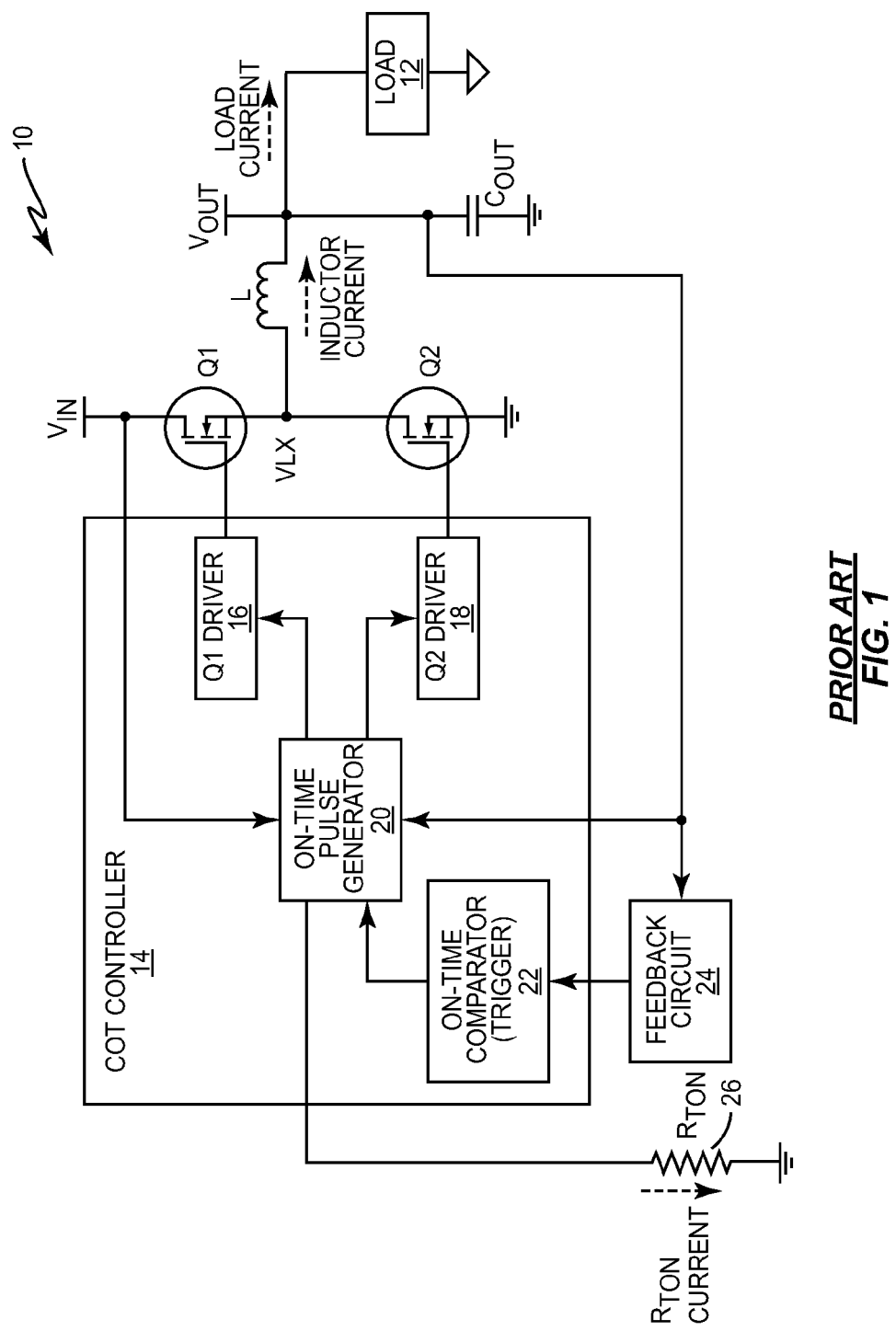
FIG. 1 is a block diagram of a known constant on-time DC-to-DC converter.
Figure 4:
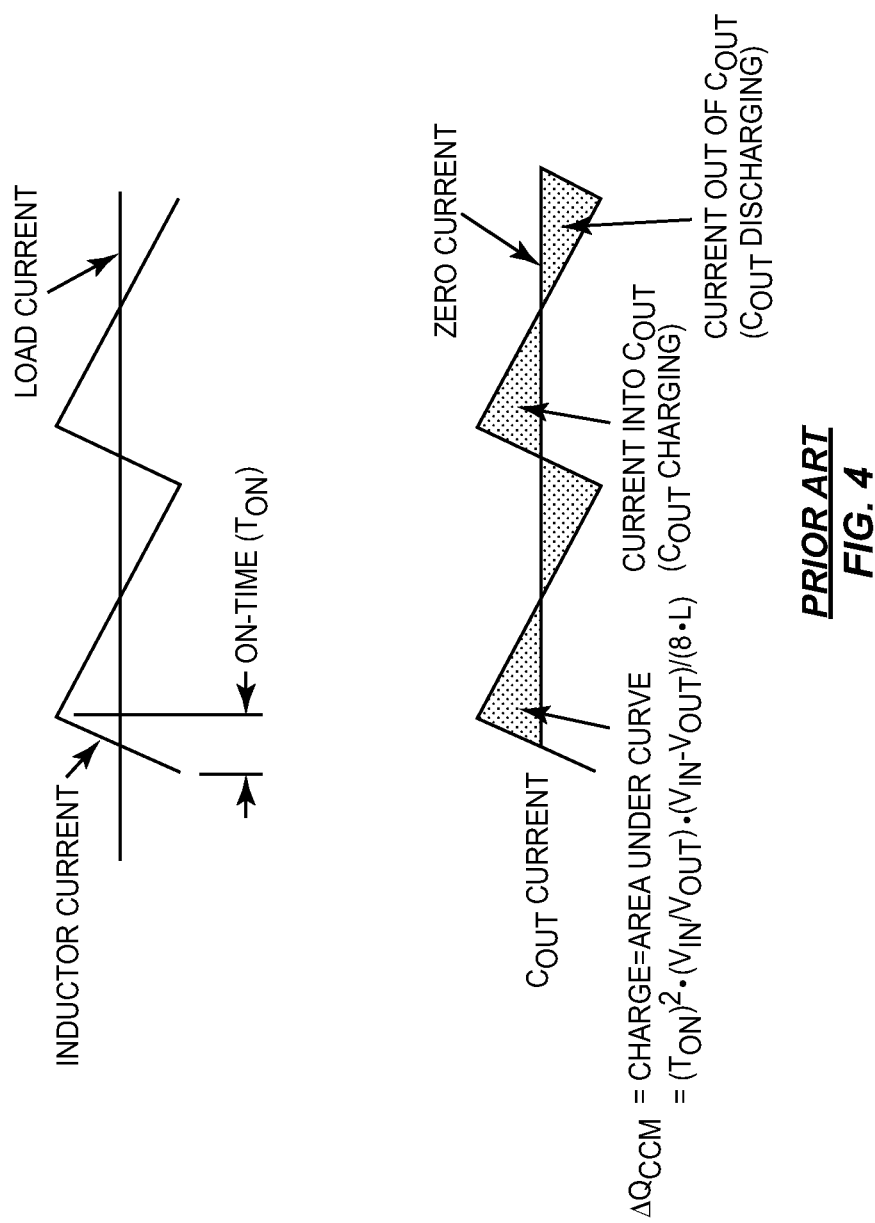
FIG. 4 is a diagram of the net charge stored in the output capacitor of the converter during normal operation.
Figure 5:
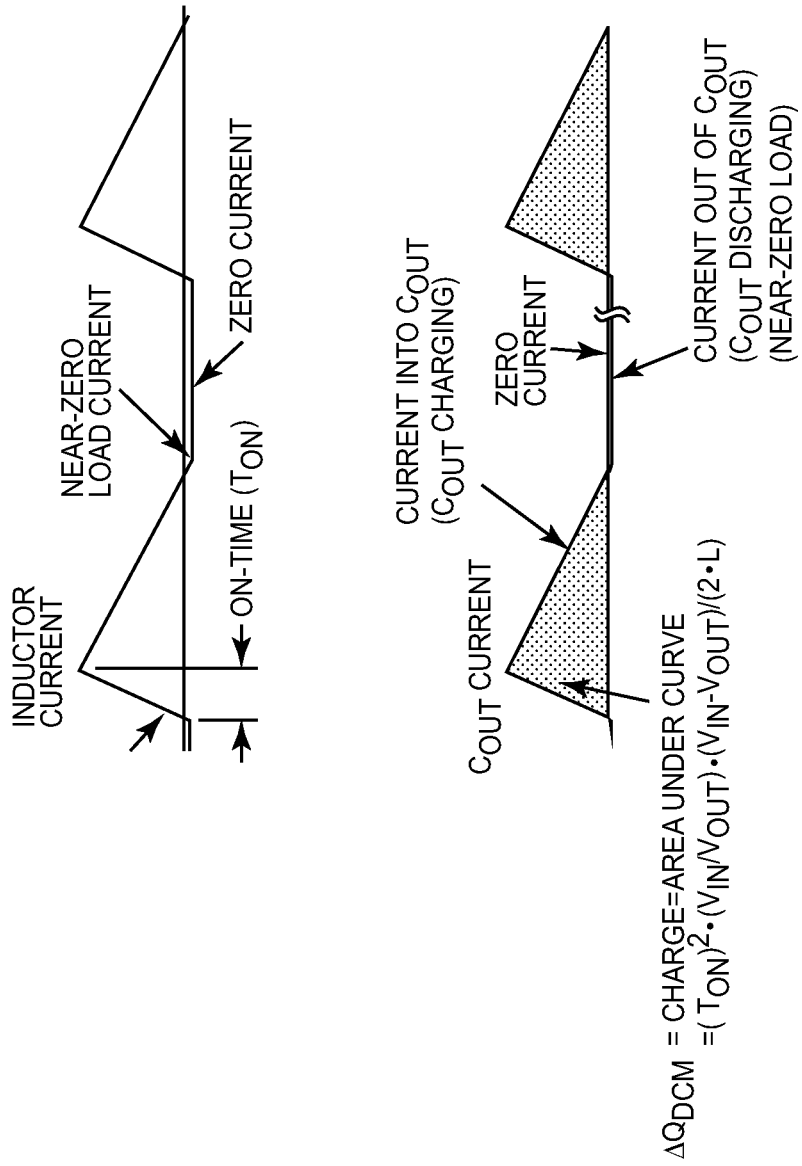
FIG. 5 is a diagram of the net charge stored in the same output capacitor during light load operation of the converter.
Figure 6:
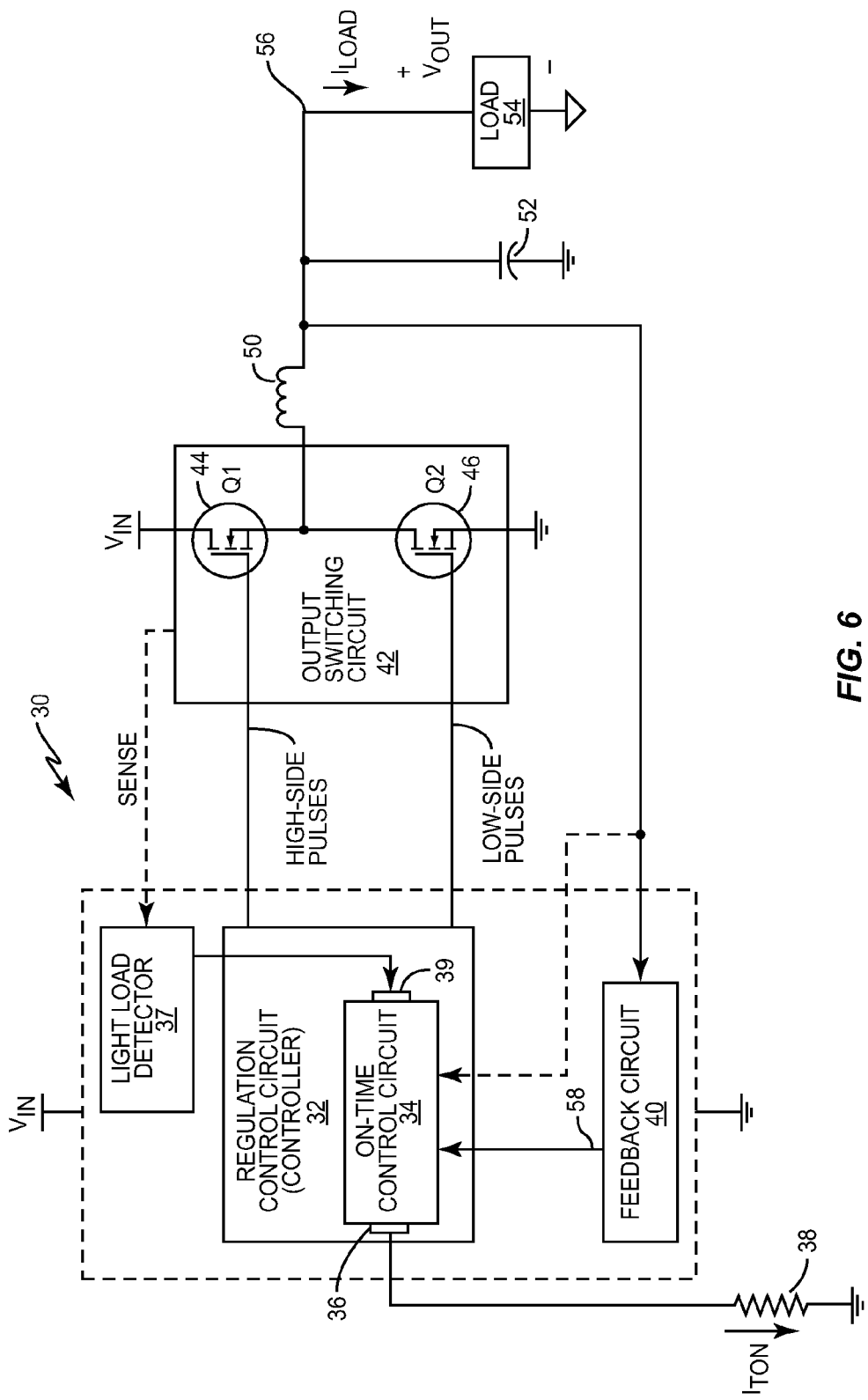
FIG. 6 is a block diagram of one embodiment of a constant on-time DC-to-DC converter according to the teachings herein.

FIG. 6 illustrates a constant on-time DC-to-DC converter 30 that is configured for constant on-time regulation according to one embodiment. It will be appreciated that the diagram is simplified by focusing in the circuit elements and/or functional blocks germane to this discussion. The constant on-time DC-to-DC converter 30 (referred to for brevity as "converter 30") may, in actual implementation, include additional functional blocks, such as control and monitoring interfaces, etc., to aid integration within a larger electronic device. For example, the illustrated "load" may comprise a cell phone, music player, computer, etc., in which the converter 30 is integrated.

In any case, the illustrated embodiment of the converter 30 includes a regulation controller 32, which is also referred to as a "regulation control circuit." The regulation control circuit 32 includes an on-time control circuit 34, which may have one or more first programming inputs 36 associated with it, such as for setting a desired constant on-time according to the impedance value of an external program resistor 38. The converter 30 in one or more embodiments includes a "light load" detector 37, which provides, for example, a light-loading detection signal at an input 39 of the on-time control circuit 34. Light load detection as a non-limiting example may be based on current sensing in or by an output switching circuit 42. In another embodiment, sensing for light load detection may be performed, e.g., by sensing current at the output inductor 50. Regardless, as will be explained in more detail, the on-time control circuit 34 may be configured to change from a "normal" operating mode to a power-saving operating mode, responsive to the detection of light loading.

The converter 30 further includes a feedback circuit 40 and it is configured to drive the switching circuit 42 with "high-side" pulses for turning a high-side switch 44 on and off, and with "low-side" pulses for turning a low-side switch 46 on and off. While the switching circuit 42 is shown external to the converter 30, it is contemplated that it will be integrated in one or more embodiments. One also sees the output inductor 50, also referred to as the "switched" inductor 50, an output capacitor 52, and a load 54. The converter 30 drives the switching circuit 42, to generate an output voltage ($V_{OUT}$), for providing current to the load 54 ($I_{LOAD}$) at a regulated voltage.

In at least one embodiment, the regulation control circuit 32 is configured to regulate the output voltage $V_{OUT}$ generated at the output 56 of the switching circuit 42, which is supplied by an input voltage $V_{IN}$. The output voltage is generated based on the regulation control circuit 32 generating high-side and low-side pulses for driving the high-side and low-side switches 44 and 46, respectively, in the switching circuit 42 according to a switching cycle having a constant on-time for the high-side switch 44, at least during normal mode operation, and a variable on-time for the low-side switch 46.

Correspondingly, the feedback circuit 40 is configured to provide a regulation feedback signal 58 to the regulation control circuit 32, for controlling the variable on-time of the low-side switch 46 as needed to maintain regulation of the output voltage $V_{OUT}$. That is, while holding the on-time of the high-side switch 44 constant over repeating switching cycles, the regulation control circuit 32 varies the on-time of the low-side switch 46 over those repeating switching cycles as needed to maintain the output voltage $V_{OUT}$ within the targeted output voltage range.

The on-time control circuit 34, which in the illustrated embodiment is included in the regulation control circuit 32, is configured to decrease output voltage ripple in the output voltage $V_{OUT}$ during a power saving mode of operation of the regulation control circuit 32. Here, normal mode operation may be entered or maintained based on directly or indirectly detecting that load current is within a given range, and power saving mode operation may be entered based on directly or indirectly detecting that load current is below a given threshold, or zero. Again, the light load detector 37 may be configured to provide or otherwise respond to the desired approach to load detection.

The on-time control circuit 34 reduces the output voltage ripple during the power saving mode of operation by shortening the on-time of the high-side switch 44 during the power saving mode, as compared to the constant on-time used during a normal mode of operation of the regulation control circuit 32. Thus, in at least one embodiment, the converter 30 operates in a normal mode during normal load conditions, during which it regulates the output voltage according to a constant-on time control scheme, by switching the high-side and low-side switches 44 and 46 on and off over a series of repeating switching cycles, where the on-time of the high-side switch 44 in each switching cycle is held to a constant value and the on-time of the low-side switch 46 is varied, as needed to maintain output voltage regulation.

Then, responsive to detecting light load conditions, the converter 30 transitions to the power saving mode, wherein it reduces switching losses by extending the switching cycle via the insertion of a variable dead time. Advantageously, in at least one embodiment, the converter 30 is configured to set the on-time of the high-side switch 44 in such a manner that this extension of the switching cycle causes the on-time of the high-side switch to be reduced. Because that prevents excess charge from being transferred to the output capacitor of the converter 30 during light load conditions, the reduction in the on-time tends to reduce output voltage ripple.

Figure 7:
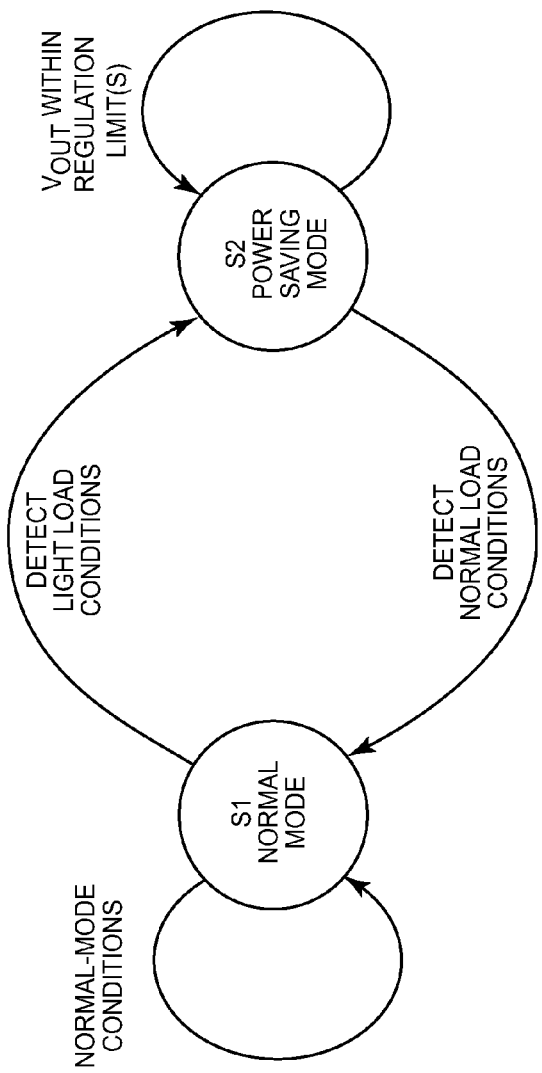
FIG. 7 is a state diagram of one embodiment of normal mode and power saving mode operational states for the converter of FIG. 6.

See FIG. 7, for example, for a simplified state machine showing two states: State S1 constituting the normal mode of operation of the converter 30/regulation control circuit 32; and State S2 constituting the power saving mode of operation of the converter 30/regulation control circuit 32. Other states that may represent possible logical operating states for the converter 30/regulation control circuit 32, such as "start-up," "error," etc., are not illustrated.

State S1 (normal mode) may be regarded as the default mode of operation of the regulation control circuit 32. Barring errors or other exception conditions, the regulation control circuit 32 will operate in its normal mode until it detects light loading conditions. For example, the regulation control circuit 32 may use output current sensing, may detect inductor current in the inductor 50, or may detect current through the high-side and/or low-side switches 44 and 46, or some combination of these techniques (or other techniques as are known) to detect light load conditions. However detected, the example regulation control circuit 32 changes from normal mode (State S1) to "power saving mode" (State S2) responsive to detecting light loading conditions. In the power saving mode, the regulation control circuit 32 extends the switching cycle by inserting additional dead time during which neither the high-side switch 44 nor the low-side switch 46 is turned on.

In any case, the regulation control circuit 32 is configured to enter the power saving mode of operation responsive to detecting light load conditions. Further, the regulation circuit 32 reduces switching losses in the switching circuit 42 while operating in the power saving mode by inserting a variable dead time into the switching cycle.

In one embodiment, the regulation control circuit 32 is configured to set the on-time of the high-side switch 44 during the normal mode of operation according to a relationship between the input and output voltages $V_{IN}$ and $V_{OUT}$. Thus, for given values of the input and output voltages, the on-time is a constant value. A change in the input voltage and/or the output voltage target would result in a different constant value. Here, "relationship" means a ratio in one embodiment, such as $V_{OUT}/V_{IN}$—but the on-time for the high-side switch 44 during normal mode operation is, in each switching cycle, held constant for a given input/output voltage relationship.

However, to reduce output voltage ripple, the on-time control circuit 34 is configured to shorten the on-time of the high-side switch 44 during the power saving mode of operation to about one-half the value of the constant on-time used for the high-side switch 44 during the normal mode of operation. In some sense, this may be regarded as the regulation control circuit 32 using a first, constant on-time $T_{ON1}$ when operating in normal mode (State S1) and a second, shorter on-time $T_{ON2}$ when operating in power saving mode (State S2).

Figure 8:
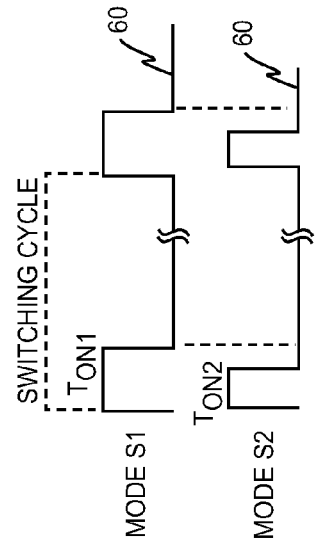
FIG. 8 is a diagram of the constant on-time reduction in power-saving mode.

See FIG. 8 for an example of the reduction in the on-time of the high-side switch 44 when operating in power saving mode. The diagram omits the pulse waveform for the low-side switch 46, and shows only pulse waveform for driving the high-side switch 44—i.e., it depicts the high-side pulses generated by the regulation control circuit 32 in the normal mode as having a constant on-time of $T_{ON1}$ in the normal mode and as having a reduced on-time $T_{ON2}$ in the power saving mode.

The absolute value of $T_{ON1}$ in seconds (e.g., microseconds) may be set by the regulation controller 32 as a function of the given input/output voltage relationships, and the absolute value of the $T_{ON2}$ may be set as a fraction of $T_{ON1}$, or otherwise determined in some sense relative to $T_{ON1}$ (e.g., one-half of $T_{ON1}$). This is still regarded as a "constant on-time" control because the on-time for the high-side switch 44 is constant during normal mode operation, and may be constant during operation in the power saving mode, although the power-saving mode on-time is shortened. Thus, at least $T_{ON1}$ is a constant on-time and $T_{ON2}$ also may be a constant on-time, but where $T_{ON2} < T_{ON1}$.

Figure 9:
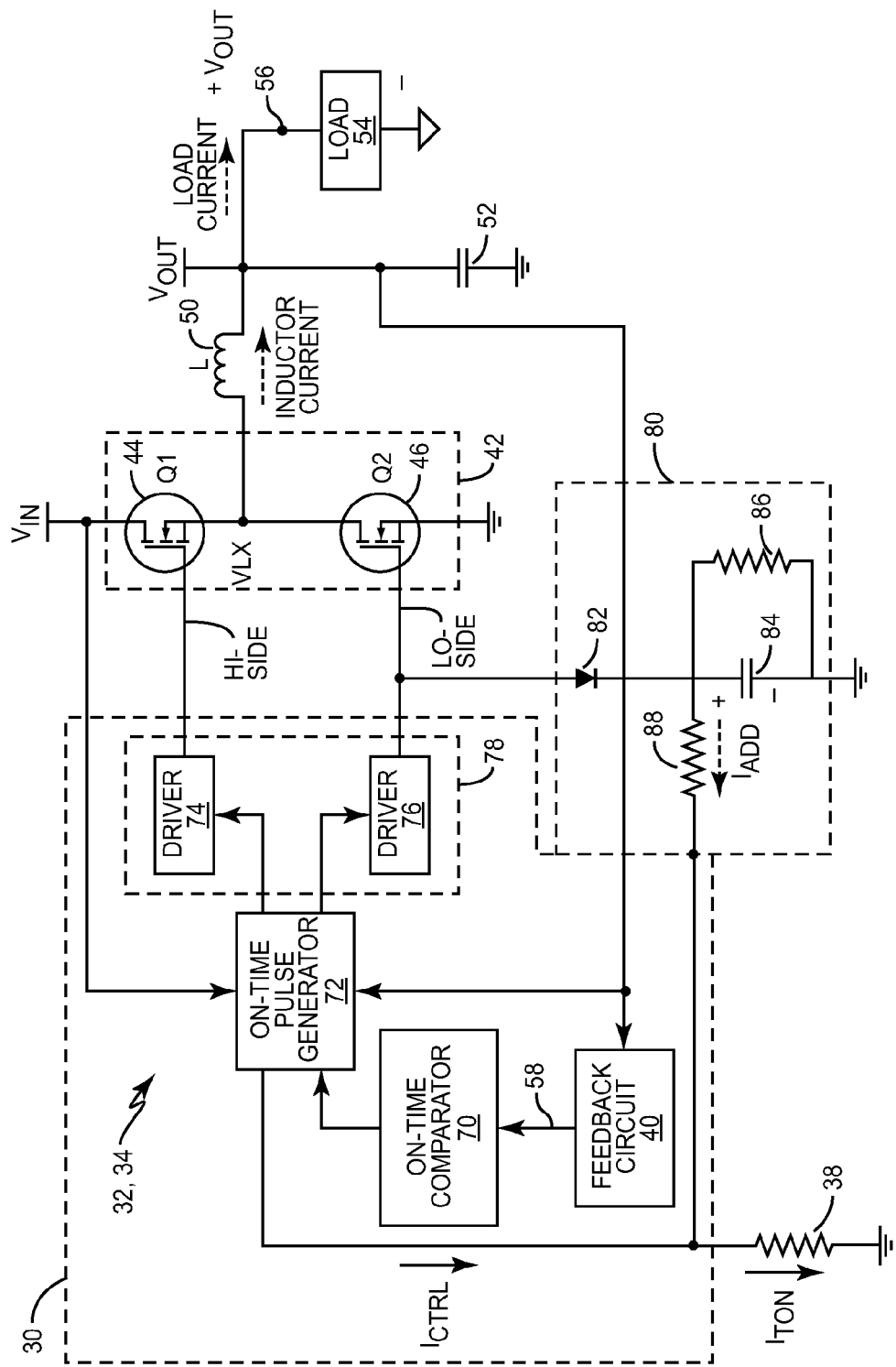
FIG. 9 is a diagram of example details for one embodiment of the converter introduced in FIG. 6.

FIG. 9 illustrates one implementation approach for achieving the desired reduction in constant on-time during operation of the converter 30 in the power saving mode, but it should be understood as a non-limiting example. In the illustration, one sees various collections of circuits within the indicated boundary comprising the converter 30 which function as the aforementioned regulation control circuit 32, on-time control circuit 34, and feedback circuit 40, as introduced in FIG. 6.

In the illustrated example, the feedback circuit 40 provides the feedback regulation signal 58 as a divided-down version of the output voltage $V_{OUT}$, e.g., such as might be taken from the middle of a resistive voltage divider. The signal 58, denoted as $V_{FB}$, serves as one input to an on-time comparator 70, which has its other input tied to a reference voltage, $V_{REF}$. The relationship between $V_{FB}$ and $V_{REF}$ will be understood as setting the desired output voltage level—i.e., the relationship establishes the output voltage level at which the converter 30 maintains $V_{OUT}$.

The on-time comparator 70 drives the on-time pulse generator 72, which "clocks" the high-side driver 74 and low-side driver 76 on-and-off. These drivers are generally referred to as drive circuitry 78. The drive circuitry 78 generates the high-side pulses for driving the high-side switch 44 and the low-side pulses for driving the low-side switch 46, according to a switching cycle in which the on-time of the high-side switch 44 is constant and the on-time of the low-side switch 46 is varied as needed to maintain regulation of $V_{OUT}$.

FIG. 9 illustrates one embodiment of the converter 30, as configured to shorten the on-time of the high-side switch 44 during power saving mode, as compared to the constant on-time used for the high-side switch 44 during normal mode. The regulation control circuit 32/on-time control circuit 34 includes an on-time comparator 70, which drives an on-time pulse generator 72, which in turn drives a high-side driver 74 and a low-side driver 76. The high-side driver 74 generates high-side pulses for turning the high-side switch 44 on and off, and the low-side driver 76 generates low-side pulses for turning the low-side switch 46 on and off.

One further sees an additional current circuit 80, which may be considered as part of the constant on-time circuit 34. The additional current circuit 80 includes a diode 82, a capacitor 84, a first resistor 86, and a second resistor 88.

The on-time pulse generator 72 is configured to impress a ratio of the input voltage $V_{IN}$ across the program resistor 38. It does so by sourcing a current $I_{CTRL}$, which combines with $I_{ADD}$ from the additional current circuit 80 to form $I_{TON}$, which sets the voltage impressed across the program resistor 38. A circuit designer sizes the program resistor 38 to set the desired value of the constant on-time used for the high-side switch 44 in the normal mode of operation.

Thus, the magnitude of $I_{CTRL}$ depends on the value of the program resistor 38 and on the magnitude of $I_{ADD}$. Put simply, if $I_{ADD}$ is zero, then $I_{CTRL}$ must provide all of $I_{TON}$, and $I_{CTRL}$ can decrease in proportion to increases in $I_{ADD}$. Advantageously, the converter 30 is configured to set the width of the high-side pulses—i.e., the on-time of the high side switch 44—as a function of $I_{CTRL}$ in both the normal and the power saving modes. Correspondingly, $I_{CTRL}$ is generated in a way that is influenced by the particular operating mode of the converter 30, so that the on-time of the high-side switch 44 takes on the desired or programmed constant value during operation in the normal mode, and is comparatively shortened during operation in the power saving mode.

While not shown, the on-time pulse generator 72 uses $I_{CTRL}$ (or, equivalently, a mirrored version of $I_{CTRL}$) to charge a capacitor from zero to a ratio of $V_{OUT}$. Thus, the magnitude of $I_{CTRL}$ establishes the slope of the ramping voltage signal generated on the capacitor being charged by $I_{CTRL}$. With this implementation, the constant on-time used for the high-side switch 44 during normal mode operation is determined by the value of the program resistor 38 and the values of $V_{IN}$ and $V_{OUT}$, and is not dependent on the load 54.

An additional current circuit 80 advantageously modifies the above operation based on the way in which it generates $I_{ADD}$, to achieve the reduction in constant on-time for power saving mode. The additional current circuit 80 may be regarded as part of the on-time control circuit 34 although one or more of its circuit elements may be external to the converter 30.

When the low-side driver 76 drives the low-side switch 46 on, that drive signal charges the capacitor 84 through the diode 82. Assuming a 5V drive signal, for example, the capacitor 84 is charged to about 5V during the on-time of the low-side switch 46. When the low-side drive signal is low, the diode 82 prevents the capacitor 84 from discharging back into the low-side driver 76. Instead, the capacitor 84 discharges through the resistor 86, and through the resistor 88, which is in series with the program resistor 38. Thus, the additional current circuit 80 provides a current $I_{ADD}$ that has its maximum value when the low-side pulse is asserted and the capacitor 84 is fully charged. However, the magnitude of this current begins decaying after each low-side pulse ends—i.e., once the low-side pulse ends, current no longer flows through the diode 82 and, instead, the capacitor 84 begins discharging through the resistors 86 and 88.

Because the on-time pulse generator 72 is configured to hold the voltage across the program resistor 38 constant, it varies $I_{CTRL}$ in dependence on the magnitude of the additional current $I_{ADD}$ flowing through the resistor 88. In other words, voltage across the on-time resistor 38 will remain fixed so long as the current $I_{TON}$ flowing through the resistor 38 remains constant.

In the example configuration, $I_{TON}$ is formed as the sum of $I_{CTRL}$ from the on-time pulse generator 72 and $I_{ADD}$ from the additional current circuit 80. Thus, as the capacitor 84 discharges, $I_{ADD}$ decreases and the on-time pulse generator 72 increases $I_{CTRL}$, as needed, to maintain a constant $I_{TON}$ and thereby maintain a fixed voltage across the program resistor 38. The magnitude of $I_{CTRL}$ determines the charging rate of the capacitor internal to the on-time pulse generator 72, and that charging rate determines the width of the high-side pulses used to turn on the high-side switch 44—i.e., the $I_{CTRL}$-based charging rate sets the on-time of the high-side switch 44 in both the normal mode and the power saving mode of operation.

In a particular example embodiment, for a given switching cycle, the high-side switch 44 is turned on and $I_{CTRL}$ begins charging the internal capacitor mentioned above. The voltage on that capacitor is compared to a reference voltage, which is $V_{OUT}$ or a defined ratio of $V_{OUT}$. When the capacitor voltage reaches the reference voltage, the high-side switch 44 is turned off. Thus, the charging rate provided by $I_{CTRL}$ determines the on-time of the high-side switch 44.

Now, during normal operation, each switching cycle includes a first portion in which the high-side switch 44 is turned on, followed by a remaining portion in which the low-side switch 46 is turned on. Thus, during normal mode operation, the capacitor 84 is regularly charged up and there is always some amount of $I_{ADD}$ being sourced into the program resistor 38, meaning that $I_{CTRL}$ is correspondingly reduced. More importantly, $I_{ADD}$ does not decay much over the normal-mode switching cycle, meaning that its contribution to $I_{TON}$ can be treated as constant or nearly so, which in turn means that $I_{CTRL}$ can be understood as being constant or nearly so during a normal-mode switching cycle.

However, during power saving mode, the converter 30 inserts dead time into the switching cycles, in which neither switch is on—i.e., both the high-side switch 44 and the low-side switch 46 are held in the off state at the same time. The converter 30 adjusts the dead time, for example, to the point where it minimizes the switching frequency while not violating output voltage minimums. To the extent that $I_{ADD}$ falls off (decays appreciably) during such dead time, $I_{CTRL}$ correspondingly increases appreciably and that increase causes the on-time pulse generator 72 to shorten the pulse width of the high-side pulses used to turn on the high-side switch 44.

With this arrangement, the on-time of the high-side switch 44 has an inverse relationship to the magnitude of the program current $I_{CTRL}$. Higher values of $I_{CTRL}$ result in shorter on-times for the high-side switch 44. In turn, the magnitude of $I_{CTRL}$ changes inversely with the magnitude of $I_{ADD}$—i.e., as $I_{ADD}$ increases, $I_{CTRL}$ decreases and vice versa. At light loads, the time between on-time pulses of the high-side switch 44 increases due to the insertion of dead times during power-saving mode. Thus, the extended switching cycles used in power saving mode allow the capacitor 84 to discharge more, as compared to its discharge during normal mode operation, which causes $I_{ADD}$ to decay appreciably over the switching, and the on-time of the high-side switch 44 is correspondingly decreased during the power saving mode.

The above arrangement can therefore be understood as one example of fixing the on-time of the high-side switch 44 during normal mode operation to a first, constant value denoted $T_{ON1}$, and automatically reducing that on-time to a second, shorter value $T_{ON2}$. The value of $T_{ON2}$ also may be constant, at least for a given amount of switching cycle dead time. In at least one embodiment, the converter 30 is configured to set $T_{ON2}$ to be some desired fraction of $T_{ON1}$. For example, $T_{ON2}$ as used in the power saving mode of operation is approximately one-half of $T_{ON1}$ as used in the normal mode of operation.

Normal mode operation may be referred to as continuous conduction mode or "CCM" because at any given point within one switching cycle, either the switch 44 or the switch 46 is on (ignoring any "inherent" dead times associated with the finite delays in turning transistor switches on and off). Conversely, power saving mode operation may be referred to a discontinuous conduction mode or "DCM" because the switching cycles are extended by the insertion of dead time in which both the high-side and low-side switches 44 or 46 are held in the off state. The circuit components are sized so that in CCM the discharge time of the capacitor 84 is short and the voltage across the capacitor 84 drops very little during the normal switching cycle.

Figure 10:
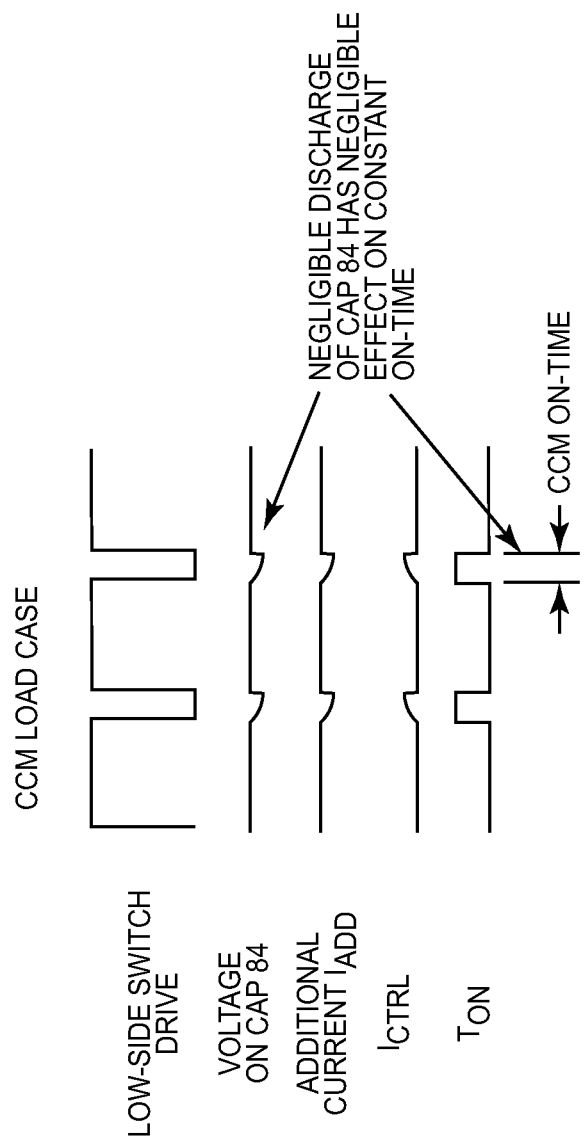
FIG. 10 is a diagram of certain waveforms associated with operation of the converter of FIG. 9 during normal mode.
Figure 11:
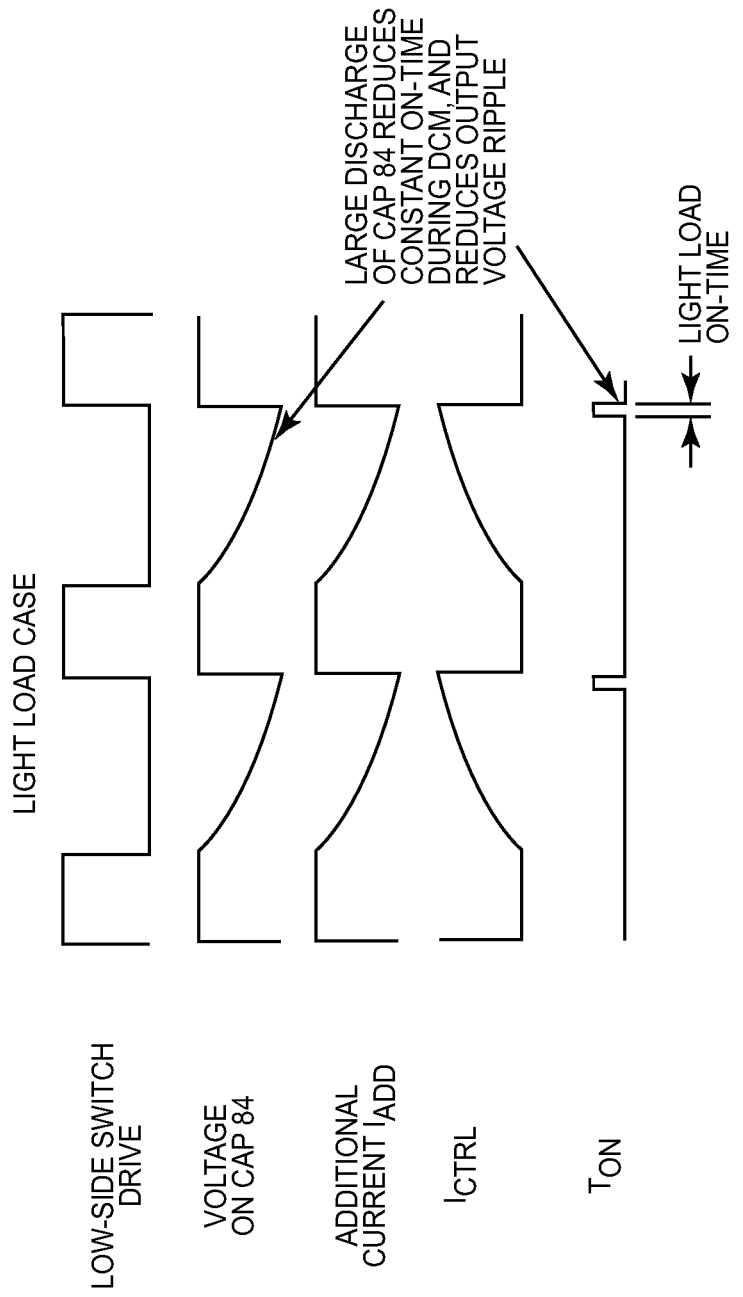
FIG. 11 is a diagram of the same waveforms as introduced in FIG. 10, but for operation of the converter during power saving mode.

FIG. 10 illustrates example waveforms for normal mode (CCM) operation. One sees relatively little discharge of the capacitor 84 over the normal-mode switching cycles. FIG. 11 provides a contrasting illustration of the same waveforms for power saving mode (DCM) operation. In FIG. 11, one sees a large discharge of the capacitor 84 over the extended switching cycles that are characteristic of power saving mode.

When viewed in the context of these two diagrams, one sees that $I_{ADD}$ falls from its maximum value very little during the off times of the low-side switch 46 during normal mode of operation. To a first approximation, it is valid to say that the on-time for the high-side switch 44 during normal mode operation is most strongly determined by the state of $I_{ADD}$ at the start of the on-time. That is, $I_{ADD}$ changes very little over the switching cycle period used during normal mode operation, so its starting value substantially determines the value of $I_{CTRL}$ needed to maintain the desired $I_{TON}$ for the program resistor R38, where $I_{TON}=I_{CTRL}+I_{ADD}$.

However, the longer switching cycle time used in the power saving mode of operation, where the switching cycle is extended with the insertion of dead time, means that the value of $I_{ADD}$ decays significantly from its starting value over the extended switching cycle. In turn, as $I_{ADD}$ falls off, the on-time pulse generator 72 correspondingly increases the value of $I_{CTRL}$, to maintain a substantially constant value for $I_{TON}$ through the program resistor 38.

Because $I_{CTRL}$ fixes the charging rate of a ramp voltage generator—i.e., fixes the ramp slope that determines the on-time of the high-side switch 44, increasing $I_{CTRL}$ makes the ramp shorter and thereby shortens the on-time. This arrangement thus provides for a constant on-time for the high-side switch 44 during the normal mode of operation, and an automatic reduction of that on-time when the converter 30 changes to its power saving mode of operation in which extended switching cycle times are used.

Figure 12:
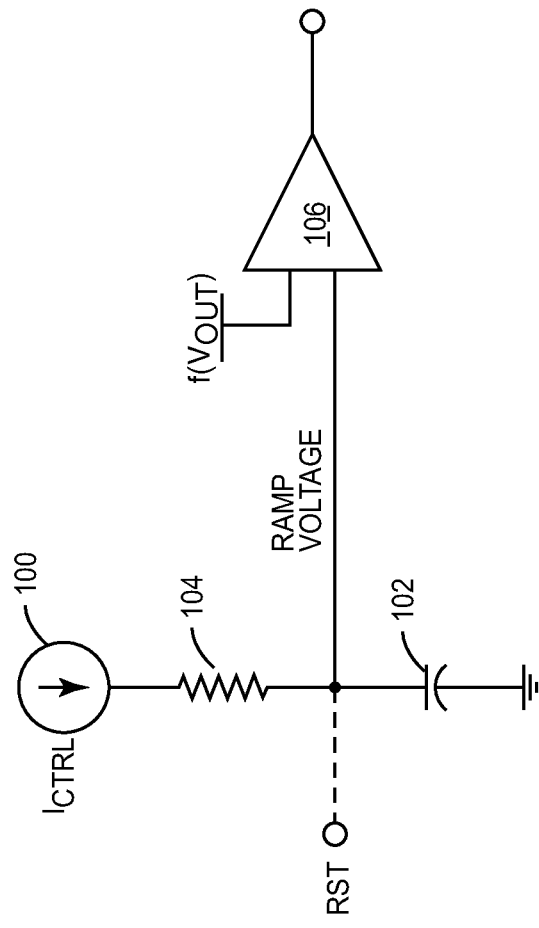
FIG. 12 is a block diagram of one embodiment of a ramp generator circuit, such as may be used in on-time control circuitry of the converter of FIG. 9.

FIG. 12 illustrates an example ramp voltage circuit included in the on-time pulse generator 72 (which may be understood as providing a one-shot timer type function). The ramp voltage circuit includes a current source 100 that sources $I_{CTRL}$ (which may be a mirrored version of the $I_{CTRL}$ into the program resistor 38). The $I_{CTRL}$ current (or, equivalently, a mirrored version of $I_{CTRL}$) charges the capacitor 102 (optionally through a resistor 104), and thus produces a ramp voltage having a slope related to the magnitude of $I_{CTRL}$.

A comparator 106 compares the ramp voltage signal to a reference voltage denoted as $f(V_{OUT})$, which is determined as a ratio of $V_{OUT}$ (e.g., a fraction of $V_{OUT}$), and changes the state of its output signal responsive to the ramp voltage signal reaching $f(V_{OUT})$. As the time it takes the capacitor 102 to charge from zero to $f(V_{OUT})$ determines the pulse width of the high-side pulses used to drive the high-side switch 44, the slope of the ramp voltage signal may be understood as controlling the on-time of the high-side switch 44.

Figure 13:
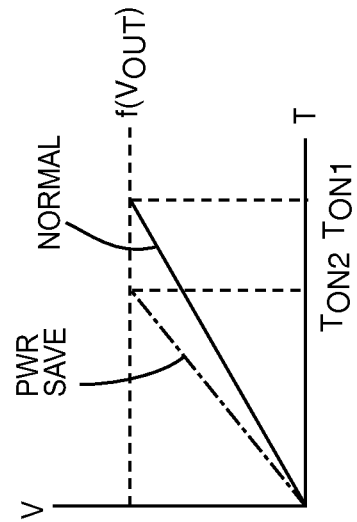
FIG. 13 is a diagram of example ramp voltages generated by the ramp generator circuit of FIG. 12.

FIG. 13 shows the net effect of the additional current circuit 80, which causes $I_{CTRL}$ to be higher during power saving mode. Thus, one sees a constant on-time of $T_{ON1}$ produced by a first ramp slope for normal mode operation, and a shorter on-time of $T_{ON2}$ produced by a second ramp slope for power saving mode.

Through proper selection of components for the capacitor 84 and the resistors 86, 88, and 38, the minimum on-time of the high-side switch 44 at no load can be set to approximately 50% of the "nominal" constant on-time of normal mode (e.g., $T_{ON2}min=½ T_{ON1}$. Such an approach yields a substantial reduction in output voltage ripple.

Of course, it is contemplated herein to effect the constant on-time reduction in a number of alternative ways. For example, circuits can be implemented to change one or more of the reference voltages as a function of light load conditions, etc., to effect a similar change in constant on-time for light loading. One may alter the apparent $V_{OUT}$ and/or $V_{IN}$ voltages, for example, and thereby change the on-time during light loading.

As has been detailed by way of example, one approach involves configuring the on-time control circuit 34 to include a current source circuit that is configured to generate a charging current in dependence on the relationship between the input and output voltages, and to change that current in dependence on the operating mode. In this regard, the additional current circuit 80 and its interaction with the on-time pulse generator 72 provides such a function. In particular, the constant on-time of the high-side switch 44 is set according to a voltage ramp signal that controls generation of the high-side pulses, wherein the voltage ramp signal is generated with a first slope during the normal mode of operation and with a second slope during said power saving mode of operation. The first slope is functionally dependent on the relationship between the input and output voltages and the second slope differs from the first slope and results in a shortened pulse width for the high-side pulses, as compared to the normal mode of operation, and thereby results in said shortened on-time for the high-side switch 44.

The converter 30 may have one or more first programming inputs for setting the constant on-time of the high-side switch 44 for the normal mode of operation, and may include one or more second programming inputs for setting a desired fractional reduction in the constant on-time of the high-side switch 44 for the power saving mode operation. For example, at least the capacitor 84 or the resistors 86 and 88 may be external, discrete components not included in the converter 30, thereby allowing the circuit designer to set the desired constant on-time parameters. In this regard, the "second programming inputs" may in fact be the same as the first programming inputs—e.g., the programming input 36 to which the program resistor 38 is attached may be the same node to which the resistor 88 is tied, for receiving $I_{ADD}$ from the additional current circuit 80. Of course, it is envisioned that there may be separate first and second programming inputs, for setting the constant on-time and/or for controlling the amount of constant on-time reduction effected in power saving mode.

In any case, in one or more embodiments, the on-time control circuit 34 is configured to set the constant on-time of the high-side switch 44 during the normal mode of operation according to the following equation $$T_{ON} = K \cdot \frac{V_{OUT}}{V_{IN}},$$

where $T_{ON}$ equals the constant on-time in seconds, $V_{OUT}$ equals the output voltage in Volts, $V_{IN}$ equals the input voltage in Volts, and K equals a programmed value determined at least in part by the program resistor 38.

Further, the on-time control circuit 34 is configured to set the constant on-time of the high-side switch 44 during the power saving mode of operation according to the following equation $$T_{ON} \approx K \cdot \frac{V_{OUT}}{V_{IN}} \cdot F,$$

where F may be a fixed or variable fractional value that determines the reduction in the constant on-time of the high-side switch 44 during the power saving mode of operation as compared to the normal mode of operation. In one embodiment, F varies as a function of load current. In another embodiment, F is a fixed number. For the earlier example, it will be understood that, for given applicable voltages, F depends on the values of the capacitor 84, the resistor 86, and the resistor 88.

In one embodiment, the converter 30 is configured so that the on-time $T_{ON}$ of the high-side switch 44 varies gradually: at no load, it is fifty percent of the $T_{ON}$ in CCM. At normal loads, it is one hundred percent of the $T_{ON}$ in CCM. For loads between "no load" and "CCM," $T_{ON}$ varies from fifty percent to one hundred percent of $T_{ON}$ in CCM, depending on load.

Recalling the background discussion regarding net charges absorbed by the output capacitor (capacitor 52 in FIG. 6, for example), an optimum reduction in output voltage ripple is achieved when $\Delta Q_{DCM} = \Delta Q_{CCM}$, which theoretically sets the output voltage ripple during DCM (power saving mode) equal to that of CCM (normal mode). This condition is achieved by setting $$T_{ON_{DCM}} = \frac{1}{2} T_{ON\,CCM}.$$

Broadly, the on-time control circuit 34 brings about this reduction in constant on-time based on being configured to carry out at least one of the following functions during the power saving mode of operation: (1) change an apparent value of the output voltage, $V_{OUT}$, as used for setting the constant on-time of the high-side switch 44; change an apparent value of the input voltage, $V_{IN}$, as used for setting the constant on-time of the high-side switch 44; and change the apparent value of the predetermined constant value, K, as used for setting the constant on-time of the high side switch 44. Here, changing the "apparent" value means changing the relevant value with respect to a particular control or feedback circuit, so that the circuit operates as if the apparent value was the actual value.

Figure 14:
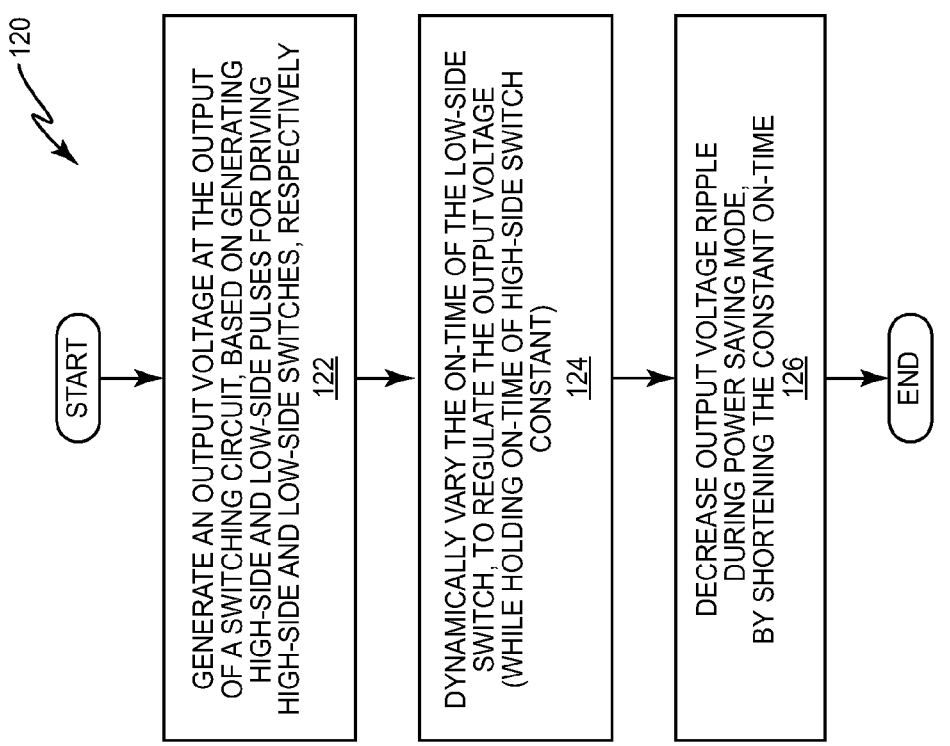
FIG. 14 is a logic flow diagram of one embodiment of a method of reducing output voltage ripple during power saving mode operation, based on reducing the constant on-time during power saving mode.

With these broad possibilities in mind, FIG. 14 illustrates a method 120 of operation for the converter 30 in one or more embodiments. It will be appreciated that the method 120 may be implemented using discrete circuitry, or using programmed/programmable circuitry, as may be included in the converter 30 in some embodiments. However, implemented, the method 120 presents an advantageous but non-limiting example of reducing the constant on-time during the power saving mode of operation.

The method 120 includes generating an output voltage $V_{OUT}$ at an output of a switching circuit 42 supplied by an input voltage $V_{IN}$, based on generating high-side and low-side pulses for driving high-side and low-side switches 44, 46, respectively, in the switching circuit 42 according to a switching cycle having a constant on-time for the high-side switch 44 and a variable on-time for the low-side switch 46 (Block 122). The method 120 further includes dynamically varying the on-time of the low-side switch 46 responsive to a feedback regulation signal 58 indicative of the output voltage $V_{OUT}$, to regulate the output voltage $V_{OUT}$ (Block 124).

Still further, the method 120 includes decreasing output voltage ripple in the output voltage $V_{OUT}$ during a power saving mode of operation of the regulation control circuit 32 by shortening the on-time of the high-side switch 44 during the power saving mode, as compared to the constant on-time used during a normal mode of operation of the regulation control circuit 32 (Block 126). In this context, the regulation control circuit 32 enters the power saving mode of operation, from its normal mode of operation, in response to detecting light load conditions and correspondingly reduces switching losses in the switching circuit 42 while operating in the power saving mode of operation by inserting a variable dead time into the switching cycle.

The above method reduces output voltage ripple, which provides a number of benefits, including the ability to use potentially smaller output capacitors, which saves space, may be cheaper, and results in lowered noise. The teachings are particularly suited for, but not limited to, applications that require power-save mode operation at light loads and require all output capacitors to be multi-layer ceramic types.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A constant on-time DC-to-DC converter comprising:
a regulation control circuit configured to regulate an output voltage generated at an output of a switching circuit supplied by an input voltage, based on generating high-side and low-side pulses for driving high-side and low-side switches, respectively, in the switching circuit according to a switching cycle that has a variable on-time for the low-side switch and, for a normal mode of operation, a constant on-time for the high-side switch;
a feedback circuit configured to provide a regulation feedback signal to the regulation control circuit, for controlling the variable on-time of the low-side switch as needed to maintain regulation of the output voltage; and
an on-time control circuit included in said regulation control circuit that is configured to decrease output voltage ripple in the output voltage during a power saving mode of operation by shortening the on-time of the high-side switch, as compared to the constant on-time used for the high-side switch during the normal mode of operation, the on-time control circuit comprising
 a one-shot timer configured to set the on-time of the high-side switch in dependence on a charging current that increases when the regulation control circuit operates in the power saving mode, wherein higher values of the charging current result in shorter on-times for the high-side switch, and
 a current source circuit configured to generate the charging current in dependence on the input voltage, such that, for a given input voltage and given programmed value, it has a first magnitude during the normal mode of operation;
wherein the feedback circuit includes an additional current circuit that provides a decaying current after each low-side pulse, such that more decay occurs during extended switching cycles used in power saving mode, and wherein said charging current varies inversely to said decaying current; and
wherein said regulation control circuit is configured to enter said power saving mode of operation responsive to detecting light load conditions and to reduce switching losses in said switching circuit while operating in the power saving mode by inserting a variable dead time into the switching cycle.

2. The constant on-time DC-to-DC converter of claim 1, wherein the regulation control circuit is configured to set the constant on-time of the high-side switch during said normal mode of operation according to a relationship between the input and output voltages.

3. The constant on-time DC-to-DC converter of claim 1, wherein said on-time control circuit is configured to shorten the on-time of said high-side switch during said power saving mode of operation to about one-half the constant on-time of said high-side switch during said normal mode of operation.

4. The constant on-time DC-to-DC converter of claim 1, wherein said on-time control circuit is configured to set the on-time of the high-side switch according to a voltage ramp signal that controls generation of the high-side pulses, wherein said voltage ramp signal is generated with a first slope during said normal mode of operation to set the constant on-time used for the high-side switch during said normal mode of operation, and with a second slope during said power saving mode of operation, said second slope differing from said first slope and resulting in a shortened pulse width for said high-side pulses, as compared to said normal mode of operation.

5. The constant on-time DC-to-DC converter of claim 1, wherein said constant on-time DC-to-DC converter includes one or more first programming inputs for setting the constant on-time of the high-side switch for said normal mode of operation, and includes one or more second programming inputs for setting a desired fractional reduction in the constant on-time of the high-side switch for said power saving mode operation.

6. The constant on-time DC-to-DC converter of claim 1, wherein said on-time control circuit is configured to set the on-time of the high-side switch during said normal mode of operation according the following equation $$T_{ON} = K \cdot \frac{V_{OUT}}{V_{IN}},$$

where $T_{ON}$ equals the on-time in seconds, $V_{OUT}$ equals the output voltage in Volts, $V_{IN}$ equals the input voltage in Volts, and K equals programmed value, and wherein said on-time control circuit is configured to set the on-time of the high-side switch during said power saving mode of operation according to the following equation $$T_{ON} \approx K \cdot \frac{V_{OUT}}{V_{IN}} \cdot F,$$

where F is a fixed or variable fractional value that determines the reduction in the on-time of the high-side switch during said power saving mode of operation as compared to said normal mode of operation.

7. The constant on-time DC-to-DC converter of claim 1, wherein said on-time control circuit is configured to set the constant on-time of the high-side switch during said normal mode of operation according to the following equation $$T_{ON} = K \cdot \frac{V_{OUT}}{V_{IN}},$$

where $T_{ON}$ equals the on-time in seconds, $V_{OUT}$ equals the output voltage in Volts, $V_{IN}$ equals the input voltage in Volts, and K equals a programmed value, and wherein said on-time control circuit is configured to shorten the on-time during said power saving mode of operation based on being configured to carry out at least one of the following functions during said power saving mode of operation:
 change an apparent value of the output voltage, $V_{OUT}$, as used for setting the constant on-time of the high-side switch;
 change an apparent value of the input voltage, $V_{IN}$, as used for setting the constant on-time of the high-side switch; and
 change the apparent value of the predetermined constant value, K, as used for setting the constant on-time of the high side switch.

8. A method of constant on-time control in a DC-to-DC converter, said method comprising:
 generating an output voltage at an output of a switching circuit supplied by an input voltage, based on generating high-side and low-side pulses for driving high-side and low-side switches, respectively, in the switching circuit according to a switching cycle that has a variable on-time for the low-side switch and, for a normal mode of operation, a constant on-time for the high-side switch;

dynamically varying the on-time of the low-side switch responsive to a feedback regulation signal indicative of the output voltage, to regulate said output voltage, by using a one-shot timer that is configured to set the on-time of the high-side switch in dependence on a charging current that has a higher value in the power saving mode, as compared to the normal mode, wherein higher values of the charging current translate into shorter on-times for the high-side switch, and generating the charging current in dependence on the input voltage, such that, for a given input voltage and given programmed value it has a first magnitude during the normal mode of operation;

generating a decaying current after each low-side pulse, such that more decay occurs during the extended switching cycles used in power saving mode, and causing said charging current to depend inversely on said decaying current;

for a power saving mode of operation, reducing switching losses in said switching circuit by inserting a variable dead time into the switching cycle and decreasing output voltage ripple in the output voltage by shortening the on-time of the high-side switch, as compared to the constant on-time used for the high-side switch during the normal mode of operation; and entering said power saving mode of operation, from said normal mode of operation, responsive to detecting light load conditions.

9. The method of claim 8, further comprising setting the constant on-time of the high-side switch during said normal mode of operation according to a relationship between the input and output voltages.

10. The method of claim 8, wherein said shortening of the on-time of said high-side switch during said power saving mode of operation comprises shortening the on-time to about one-half the constant on-time of said high-side switch during said normal mode of operation.

11. The method of claim 8, wherein said on-time control circuit is configured to set the on-time of the high-side switch according to a voltage ramp signal that controls generation of the high-side pulses, wherein said voltage ramp signal is generated with a first slope during said normal mode of operation and with a second slope during said power saving mode of operation, said second slope differing from said first slope and resulting in a shortened pulse width for said high-side pulses, as compared to said normal mode of operation.

12. The method of claim 8, further comprising setting the constant on-time for the high-side switch for said normal mode of operation according to one or more first programming signals, and setting the on-time for the high-side switch for said power saving mode of operation according to one or more second programming signals that establish a desired fractional relationship between the on-time of the high-side switch during said power saving mode of operation and the constant on-time of the high-side switch during said normal mode of operation.

13. The method of claim 8, further comprising setting the on-time of the high-side switch during said normal mode of operation according the following equation $$T_{ON} = K \cdot \frac{V_{OUT}}{V_{IN}},$$

where $T_{ON}$ equals the on-time in seconds, $V_{OUT}$ equals the output voltage in Volts, $V_{IN}$ equals the input voltage in Volts, and K equals a programmed value, and setting the on-time of the high-side switch during said power saving mode of operation according to the following equation $$T_{ON} \approx K \cdot \frac{V_{OUT}}{V_{IN}} \cdot F,$$

where F is a fixed or variable fractional value that determines the reduction in the on-time of the high-side switch during said power saving mode of operation as compared to said normal mode of operation.

14. The method of claim 8, further comprising setting the constant on-time of the high-side switch during said normal mode of operation according the following equation $$T_{ON} = K \cdot \frac{V_{OUT}}{V_{IN}},$$

where $T_{ON}$ equals the on-time in seconds, $V_{OUT}$ equals the output voltage in Volts, $V_{IN}$ equals the input voltage in Volts, and K equals a programmed value, and shortening the on-time of the high-side switch during said power saving mode of operation by performing at least one of the following functions during said power saving mode of operation:

changing an apparent value of the output voltage, $V_{OUT}$, as used for setting the constant on-time of the high-side switch during said normal mode of operation;

changing an apparent value of the input voltage, $V_{IN}$, as used for setting the constant on-time of the high-side switch during said normal mode of operation; and changing the apparent value of the programmed value, K, as used for setting the constant on-time of the high side switch during said normal mode of operation.

* * * * *